June 12, 1956 K. J. LEASY 2,749,973
VEHICLE LEG REST
Filed Dec. 23, 1954
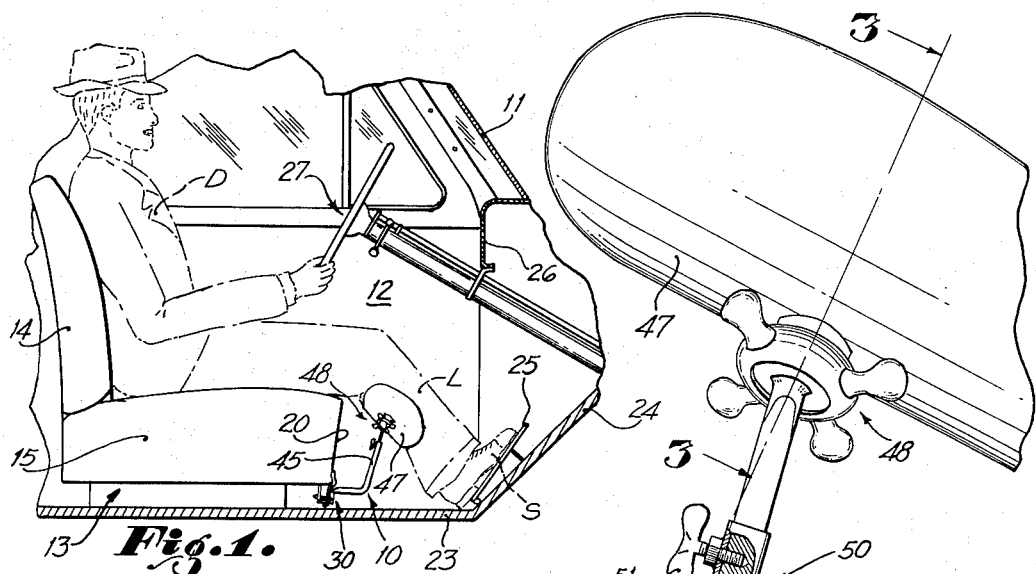
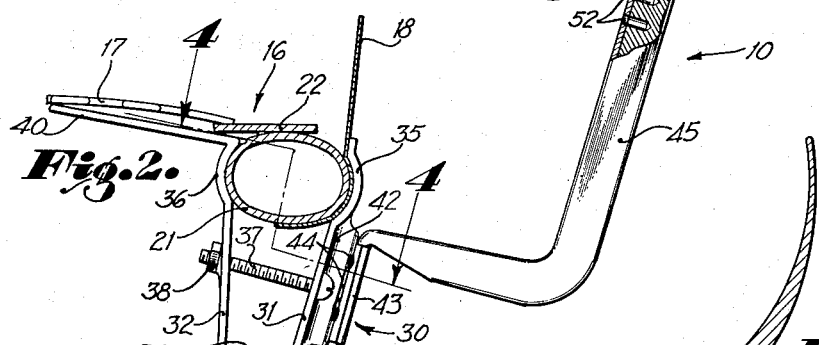
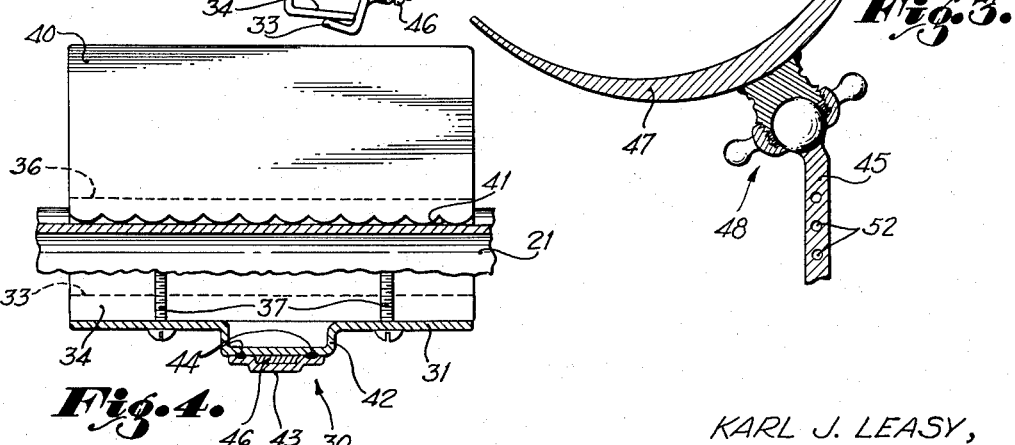
KARL J. LEASY,
INVENTOR.
BY
AGENT.

United States Patent Office 2,749,973
Patented June 12, 1956

---

2,749,973

VEHICLE LEG REST

Karl J. Leasy, Los Angeles, Calif.

Application December 23, 1954, Serial No. 477,179

2 Claims. (Cl. 155—172)

The present invention relates generally to a leg rest device and relates more specifically to such a leg rest device adapted primarily for use in connection with automotive vehicles.

While heretofore several efforts have been made toward the design and/or manufacture of vehicle leg rests for use in contact with the right leg as is most commonly applied to an automotive throttle, such prior devices have failed to meet all of the necessary requirements in order that they might be as useful as possible. For example, it is not always desirable that a leg rest of this type be available for use at all times. However, the arrangement must be such so as to permit the use with a minimum of attachment or removal effort and to permit adjustment of the various portions of the rest as may be necessary in order to conform to the particular configuration of the individual driving the vehicle. In prior devices leg rests for this same purpose have been either cumbersome, lacking in utility, uncomfortable, and/or have been a permanent part of the vehicle with the exception of complex removal structure such as bolts, screws or the like.

Additionally, prior like arrangements have been designed for use primarily in connection with automotive vehicles having wooden floor boards and seat construction. Accordingly, such prior arrangements are not adaptable for use in contemporary vehicles in view of present day metallic seat frames and steel floor boards.

Accordingly, it is one important object of the present invention to provide a combination leg rest arrangement adapted for cooperation with a vehicle seat and wherein novel means are provided for enabling removable attachment to the seat and adjustability relative to the leg of the vehicle driver.

Another important object of the present invention is to provide a vehicle leg rest arrangement wherein novel clamp means are provided to enable fastening to various types of automotive seats in a universal manner and without resorting to various types of fittings, specific configurations or alternative designs as might otherwise be necessary to enable use with all types of contemporary automotive vehicles.

Another important object of the present invention is to provide an automotive vehicle leg support having means enabling free removal of the support from a supporting structure without regard for any separate clamping means.

Other and further important objects of the present invention will become apparent from the disclosures in the following detailed specification, appended claims and accompanying drawing, wherein:

Fig. 1 is a side elevational view partially in section of a driving compartment of an automotive vehicle showing the present leg rest in use therewith;

Fig. 2 is an enlarged side elevational view of the leg rest and the attachment means to a portion of a vehicle seat;

Fig. 3 is a fragmentary sectional view taken substantially as indicated by line 3—3, Fig. 2; and Fig. 4 is a plan view partially in section of a portion of the clamping arrangement utilized to support the present leg rest and as taken substantially as indicated by line 4—4, Fig. 2.

With reference to the drawing the leg rest of the present invention is shown in Figs. 1 and 2 as indicated generally at 10. As shown specifically in Fig. 1, the leg rest is adapted for use in conjunction with a vehicle 11 having a driver's compartment 12. The compartment 12 is provided with the usual vehicle seat indicated generally at 13 and which has a back rest portion 14 and a horizontally disposed seat portion 15. The seat portion 15 is of primary concern in connection with the present invention and, as shown in Fig. 2, comprises a frame structure 16 which may have springs 17 and which may be covered with a suitable fabric covering or the like 18. Thus, a front panel 20 for the seat portion 15 is defined which has a lower edge terminating in a frame member 21 which has welded to the upper portion thereof a cross member 22.

For the purpose of the present invention, it is to be understood that the form of seat illustrated in the drawings is merely by way of example only and that many other seat designs may be utilized without departing from the spirit and scope of the present invention. Actually, in some instances, the lower portion of the front panel 20 may be relatively thin and extend downwardly beyond a bottom wall or spring section of the cushion, or alternately, this portion of the front panel 20 may be relatively wide as shown in Fig. 2.

In addition to the seat structure 13, the vehicle compartment is generally provided with a floor board 23 and sloping portion of a fire wall 24 through which an accelerator pedal 25 is adapted to operate. Also, the compartment generally includes a dash board 26 and suitable steering mechanism 27.

In some prior instances, devices similar to that of the present invention have been attached to either the dash board or to the steering mechanism column thus presenting a structure that protruded into the leg area of the driver's compartment and creating a hazard therein. It may be seen that a driver D of the vehicle has a right leg L that is utilized, through the shoe S, to operate the accelerator pedal 25. When on long trips or the like, the leg L frequently becomes quite fatigued due to constant operation of the accelerator pedal 25 thus requiring that rest be sought or the left leg be crossed to a point where operation of the accelerator pedal may be accomplished thereby. In other instances, vehicles were permitted to coast, thus being out of control, or in the event of the provision of a throttle button in connection with the dash board 26, this button had been set for a predetermined amount of fuel. These practices are not only quite dangerous but serve no great useful purpose in actually resting a fatigued leg. Accordingly, provision must be made not only to permit rest for the leg while continuing operation of the accelerator but further to enable movement of the leg from the rest if such becomes desirable in the event of an emergency or the like. Furthermore, the rest must be freely removable from its position in association with the seat structure.

In the present instance, and as shown in Fig. 2, the leg rest arrangement 10 of the present invention comprises, among other components, a clamp arrangement indicated generally at 30. The clamp arrangement includes a generally rectangular forward plate portion 31 and the rearward plate portion 32. The plate portions 31 and 32 are provided with end tabs 33 and 34, respectively, that cooperate to limit movement of the plates toward each other. The upper portions of the plates 31 and 32 are suitably deformed as by rounding or beating as at 35 and 36, respectively, so as to enable gripping of any of a variety of front seat panel constructions.

The plates 31 and 32 are clamped into contact with the front panel portion 20 and specifically the frame portion 21 by means of screws 37 and nuts 38. In order to prevent rotation of the clamp 30 rearwardly beneath the seat, a guide plate 40 is formed integrally with and extends rearwardly from the upper edge of the plate 32. The guide plate 40 is adapted to contact from the lower edge of the seat cushion 15 or the spring or frame arrangements associated therewith. Additionally, the upper edge of the plate 32 is provided with a longitudinally extending row of serrations 41 that are adapted to engage either the seat panel 20 or a portion of the seat frame in order to prevent lateral inadvertent movement of the clamp 30.

The front plate 31 is formed with an outwardly directed integral generally U-shaped portion 42 and an attachment bracket 43 is mounted thereon and secured thereto as by spot welding 44 for example. The spot welding 44 may, of course, be replaced by screws or bolts as desired.

An L-shaped leg rest supporting arm 45 is formed with a reduced and flattened end portion 46 that is adapted for free reception in or removal from the bracket 43. The arm 45 may either be rectangular in cross section or suitably shaped to perform the desired function both from strength and appearance standpoints. A curved leg rest 47 is universally mounted as by a ball joint 48 on the upper end of the arm 45. With this construction, the rest 47 may be moved to any desired position commensurate with the configuration of the driver D.

In order to provide for vertical adjustment of the rest 47 a telescoping portion 50 is provided in the arm 45. Thus, the construction is such as to enable vertical positioning of the rest 47 due to the telescoping arrangement of the arm 45 with the set screw 51 being utilized in conjunction with a plurality of holes 52 to lock the telescoping arrangement in one position or another.

It may thus be seen that the rest of the present invention may be universally adjusted for any particular individual and may be removed from the position in conjunction with the vehicle seat by merely withdrawing the end portion 46 from the bracket 43. Thus, no sharp edges are presented that might otherwise tear clothing or the like. The rest portion 47 is adapted for engagement by the lateral or lateral-posterior portion of the driver's leg L rather than merely adjacent the posterior portion alone thus enabling mere movement of the leg to the right for engagement against the leg rest. This configuratoin enables rapid removal of the leg from the rest if such should become necessary.

Having thus described the invention and the present embodiments thereof it is desired to emphasize the fact that many modifications may be resorted to in a manner limited only by a just interpretation of the following claims.

I claim:

1. In combination: a vehicle seat having a generally horizontal cushion; a frame on said cushion; a front cushion panel on said frame; a laterally disposed elongated clamp; bolt means for compressively attaching said clamp to said seat frame along a lower edge of said front panel; a plate disposed from an upper portion of said clamp and extending beneath said seat for engagement with said seat thus to prevent pivotal movement of said clamp in a direction rearwardly beneath said seat; a generally L-shaped rest supporting arm; a bracket on said clamp, the lower end of said arm being freely disposed in and removable from said bracket; a curved leg engaging rest; a universal mounting on said rest, said mounting being carried by an upper end of said arm; said arm having a vertically telescoping portion in said arm; and set screw means for locking said telescoping portion in one or another position.

2. The combination according to claim 1 wherein said clamp is provided with a longitudinal row of serrations which are in engagement with said frame to prevent lateral movement of said clamp.

References Cited in the file of this patent
UNITED STATES PATENTS

| | | |
|---|---|---|
| 1,753,367 | Dickens | Apr. 8, 1930 |
| 2,144,140 | Batcheller | Jan. 17, 1939 |
| 2,180,768 | Peterson | Nov. 21, 1939 |